United States Patent Office 3,804,789
Patented Apr. 16, 1974

---

3,804,789
EPICHLOROHYDRIN-AMMONIA RESIN
Thomas A. Chamberlin, Midland, Mich., assignor to The Dow Chemical Company, Midland, Mich.
No Drawing. Filed Jan. 29, 1973, Ser. No. 327,392
Int. Cl. C08g 33/06
U.S. Cl. 260—29.2 EP          4 Claims

ABSTRACT OF THE DISCLOSURE

Epichlorohydrin-ammonia resins have improved properties as paper additives when reacted with 0.02–0.8 equivalent of thiourea based on the chlorohydrin moieties present. Paper made from pulp treated with the improved resins has significantly higher wet strength.

BACKGROUND OF THE INVENTION

The present invention concerns a new chemical process and an improved resinous product thereof which is particularly useful in papermaking. The invention is directed specifically to a modified epichlorohydrin-ammonia resin.

Resins made by reacting epichlorohydrin and ammonia in various proportions and by various procedures are well known. These condensation resins are basically composed of epichlorohydrin and ammonia moieties in about equal proportions alternating to form a substantially linear molecular chain. These resins have been used as surface active agents, as cationic agents to treat textile fibers and plastic films for better adhesion of dyes and plastic topcoats, and as wet end additives in papermaking to make paper with improved wet strength.

SUMMARY OF THE INVENTION

It has now been found that an epichlorohydrin-ammonia resin as described above has unexpectedly advantageous properties and, in particular, imparts superior wet strength to paper when the resin is first modified by reacting it with about 0.02 to about 0.8 equivalent of thiourea based on the chlorohydrin moieties still present in the resin. The modifying reaction can be carried out at about 0–100° C., preferably at about ambient temperature to about 80° C., and it is usually most convenient to react the thiourea with the resin in aqueous solution.

DETAILED DESCRIPTION

Preferably, about 0.03–0.5 equivalent of thiourea is reacted with the epichlorohydrin-ammonia resin by adding the thiourea in water solution to the aqueous polymer. Reaction times in the range of 0.1–10 hours are appropriate. The resulting modified resin solution can be added directly to a paper pulp slurry. Quantities of 0.1–5 percent of resin solids based on dry pulp fiber give substantially improved wet strength in the finished paper. The oxygen analog, urea, gives no such improvement when it is used in place of thiourea in the present process.

Epichlorohydrin-ammonia condensation products made by any known process are suitable for modification by the present invention to make resins having significantly improved properties. Such condensation products have been made in the past by reacting ammonia with epichlorohydrin in various proportions and under different reaction conditions. Ratios of 0.2–6 moles of ammonia per mole of epichlorohydrin have been used, for example. The resulting water-soluble products are substantially linear in structure with more or less branching depending upon the proportions of reactants and the reaction conditions used.

A preferred epichlorohydrin-ammonia resin is obtained by adding 1.1–2.2 moles of epichlorohydrin to a mole of concentrated aqueous ammonia at about ambient temperature, maintaining the temperature of the mixture from about that level up to about 100° C. until the epichlorohydrin is essentially all reacted, then adding to the reacted solution about 0.75–1.25 parts of epichlorohydrin per part by weight of resin solids. After the second addition of epichlorohydrin, the solution is maintained at about 40–100° C. until the added epichlorohydrin is also essentially all reacted. It is often of advantage to dilute the solution and stir it during the second epichlorohydrin addition to avoid gelling. This process is described in detail in Baggett, U.S. Pat. 3,655,506.

The epichlorohydrin-ammonia resin can also be made by reacting the two compounds in proportions as described above in a single step process. A by-product of both processes is glycerol dichlorohydrin (1,3-dichloro-2-propanol). This undesirable impurity is readily removed from the product solution by distilling it off as its water azeotrope under reduced pressure. Any remaining unreacted epichlorohydrin can also be removed in this way at the same time.

EXAMPLES 1–5

An aqueous solution of an epichlorohydrin-ammonia copolymer was prepared according to the process described in U.S. Pat. 3,655,506 by reacting aqueous ammonia with excess epichlorohydrin in two stages and distilling off the by-product 1,3-dichloro 2-propanol to obtain a solution containing about 35 percent solids. A portion of this solution was reacted with 0.25 equivalent of thiourea based on remaining chlorohydrin moieties in an equal volume of water at 60° C. for two hours. The resulting homogeneous solution had a solids content of about 15 percent and a pH between 4.5 and 5.0.

Other such reactions were carried out in the same way using different proportions of thiourea. Portions of these products sufficient to provide one percent resin based on the fiber content were added to samples of bleached softwood sulfite pulp which had been beaten to a Canadian Standard Freeness of 500, diluted to 0.25 percent solids, and pH adjusted to 5.0. 2.5 gm. test sheets of the treated pulp slurries were formed using a Noble and Wood sheet machine and after being dried and cured, they were soaked in water for 16 hours prior to testing. Pieces of the soaked paper 0.5 x 3.2 inches in size were tested for wet tensile strength by TAPPI method T4560S–68 using an Instron Universal testing instrument connected to a computer which automatically recorded the break point strength and also calculated the total energy absorption to that point. The procedure used for the energy absorption determination was that of TAPPI method T490S–70 adapted for use with a wet sheet. The average values obtained for five sheets from each formulation are listed in the table.

| Thiourea equivalents | Wet tensile, lbs./sq. in. | Energy absorption, lbs./sq. in. |
|---|---|---|
| 0 (control) | 338 | 722 |
| 0.025 | 352 | 822 |
| 0.05 | 472 | 1,168 |
| 0.125 | 446 | 1,192 |
| 0.25 | 555 | 1,686 |
| 0.5 | 379 | 1,110 |

I claim:
1. In a process wherein epichlorohydrin and ammonia are reacted to produce a condensation resin composed of epichlorohydrin and ammonia moieties in about equal molar proportion, the improvement wherein said resin is reacted with about 0.02 to about 0.8 equivalent of thiourea based on the remaining chlorohydrin moieties present in the resin at about 0–100° C.

2. The process of claim 1 wherein the reaction is carried out in aqueous solution.

3. The process of claim 2 wherein about 0.03–0.5 equivalent of thiourea are reacted.

4. The improved resin product of the process of claim 1.

References Cited
UNITED STATES PATENTS

| | | | |
|---|---|---|---|
| 1,977,251 | 10/1934 | Stallman | 260—127 |
| 3,441,609 | 4/1969 | McKelvey et al. | 260—583 |
| 3,594,355 | 7/1971 | Vandenberg et al. | 260—79 R |
| 3,658,641 | 4/1972 | Shen | 162—164 |

WILLIAM H. SHORT, Primary Examiner

E. A. NIELSEN, Assistant Examiner

U.S. Cl. X.R.

162—164; 260—77.5 C, 79